Sept. 22, 1959     S. B. LOGAN     2,905,054

READING GLASS AND MOUNTING

Filed July 7, 1954     4 Sheets-Sheet 1

INVENTOR.
Sandy B. Logan
BY
Donald H. Sweet
Atty.

Sept. 22, 1959
S. B. LOGAN
2,905,054
READING GLASS AND MOUNTING
Filed July 7, 1954
4 Sheets-Sheet 2
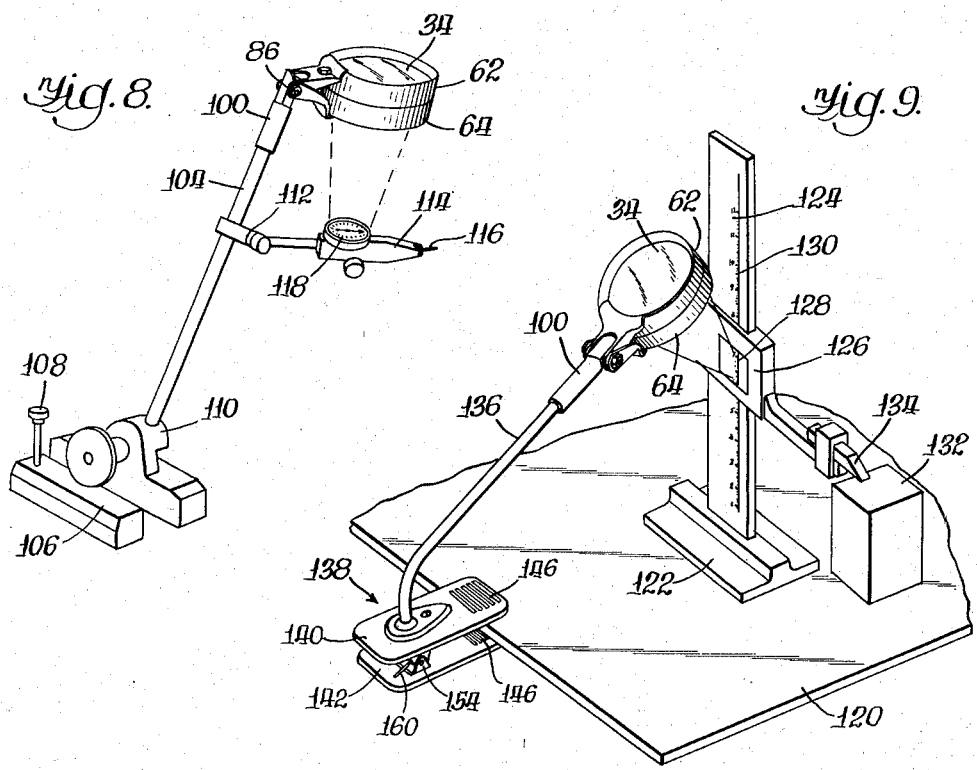
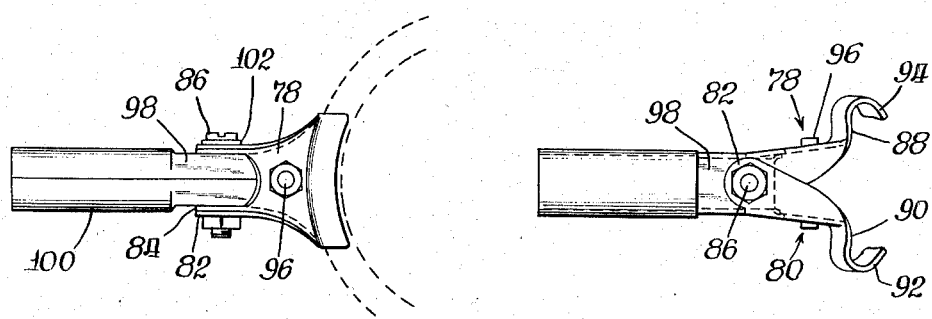
INVENTOR.
Sandy B. Logan
BY
Donald H. Sweet
Atty.

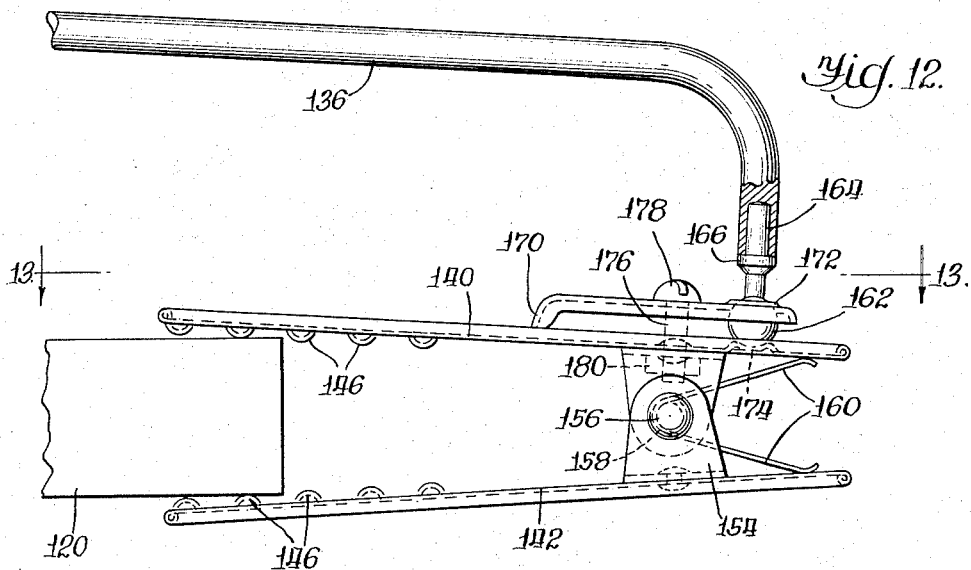
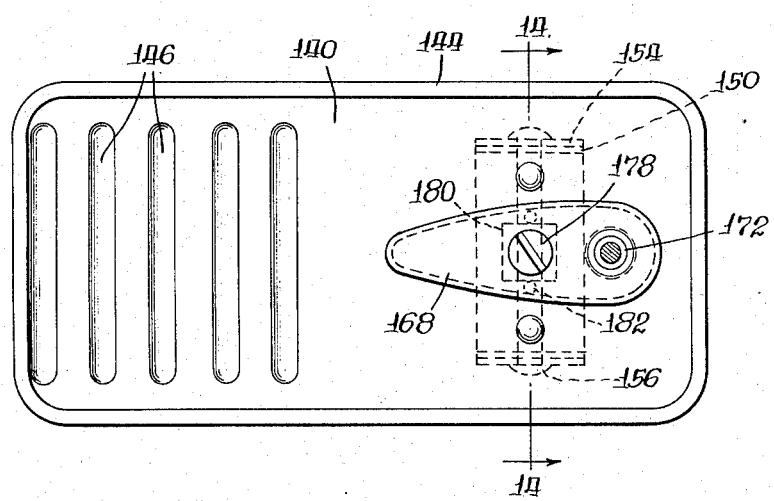
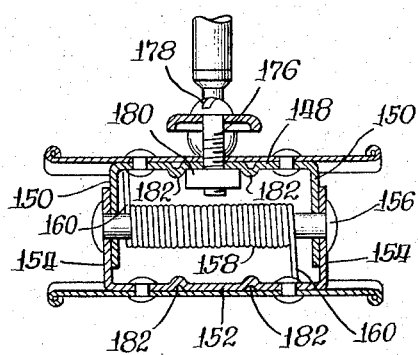

Sept. 22, 1959 S. B. LOGAN 2,905,054
READING GLASS AND MOUNTING
Filed July 7, 1954 4 Sheets-Sheet 4

INVENTOR.
Sandy B. Logan
BY
Donald H. Smout Atty.

2,905,054
READING GLASS AND MOUNTING

Sandy B. Logan, Genoa City, Wis.

Application July 7, 1954, Serial No. 441,859

1 Claim. (Cl. 88—39)

My invention relates to magnifying glasses and includes among its objects and advantages an improved glass, combined with improved fittings for using the glass in precision machine work, and an improved package for the glass. In the accompanying drawings:

Figure 8 is a perspective view of a mounting for such a lens for use in connection with a precision contact gauge;

Figure 9 is a perspective of the same lens in use in connection with a vernier height gauge;

Figure 10 is an enlarged plan view of the support fitting of Figures 8 and 9;

Figure 11 is a side view of the support fitting of Figure 10;

Figure 12 is a side view of the base clamp of Figure 9;

Figure 13 is a plan view of the base clamp of Figure 12;

Figure 14 is a section on line 14—14 of Figure 13;

Figure 1:
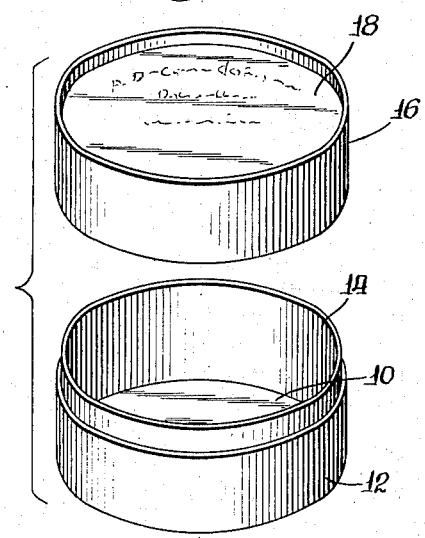
Figure 1 is a perspective view of the separate parts of a container for such a glass.
Figure 2:
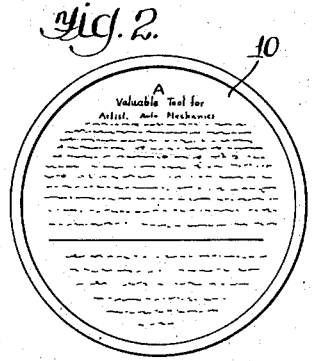
Figure 2 is a bottom view of the container.

Referring first to Figures 1 and 2, the mechanical construction of the container for the lens may be conventional and comprise a lower portion including a bottom member 10, an outer cylindrical member 12, and an inner cylindrical member 14 extending above the member 12. The cover includes the cylindrical portion 16 adapted to slide over the cylinder 14 with gentle friction and rest in abutment with portion 12. The top cylinder 16 has a plane portion 18, completing the enclosure.

On the outer side of the bottom 10, I print a descriptive identification of the contents of the container and instructions for its use. As indicated in the drawings, the description begins, "A valuable tool for artists." The body of the text of the inscription is printed in type so small that it is a little difficult, but not at all impossible, to read it with the naked eye. Accordingly, it constitutes an excellent specimen for use in demonstrating the magnifying power of the glass inside the package. In the ordinary merchandising of such items, the commonest annoyance to the salesperson is hunting for something to use to give an effective demonstration of the use of the magnifying glass. By putting such a specimen directly on the container for the glass, it is always available.

Figure 3:
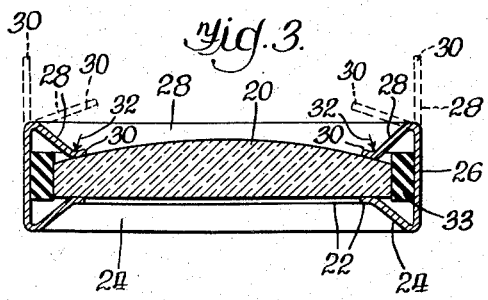
Figure 3 is a diametrical section of the glass with a one-piece lens means.

Referring now to Figure 3, the transparent, ceramic, lens element 20 is gripped in a one-piece annulus comprising the lower lip 22, the lower cone 24, and the upper band 26, the upper cone 28 and the upper lip 30. I prefer to form the lower lip 22 with a plane top surface bearing against the element 20 over a material area.

The annular holder is first formed into shape with the portions 28 and 30 forming a continuation of the portion 26, as clearly indicated in dotted lines. Then the lens 20 is laid in place and a forming die is brought down from above to force the portions 28 to 30 over into the intermediate dotted line position indicated at the left side of Figure 3. Subsequently, another die, having its chief contact edge located at the point indicated by the arrows 32 in Figure 3, comes down and moves the parts into the final, assembled position. A spacer ring 33 of rubber or flexible plastic may be laid between the element 20 and the band 26 before assembly, to hold the element 20 in place during assembly.

As indicated in the drawings, the final condition is with the upper lip 30 inclined at an angle of approximately ten degrees to a transverse plane, whereas the cone 28 is inclined at about forty-five degrees. Because of the much greater inclination and materially greater dimension of the conical portion 28, it is materially stiffer than the lip 30, and when the pressure of the die at 32 is removed, the greater flexibility of the lip 30 will cause the metal to recover, or flex in a reverse sense, by a distance of the order of magnitude of one-half thousandth of an inch, leaving the entirety of the metal in the holder under material mechanical stress, so that the element 20 is tightly held. It will be noted that the cones 24 and 28 both extend axially considerably beyond the element 20, so that the entire assembly may be dropped on a flat surface and no matter what position it happens to occupy when it strikes, there will be no contact or impact between the element 20 and the surface.

Figure 4:
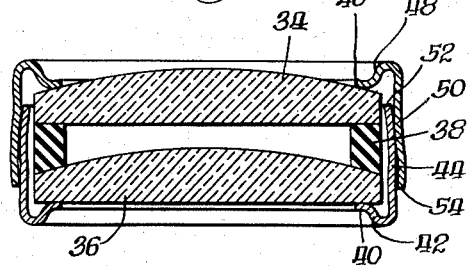
Figure 4 is a similar section of the glass with a two-piece lens means.

Referring now to Figure 4, I have indicated an element 34 and a companion element 36 axially spaced therefrom, with the convex sides of both lenses facing in the same direction. This combination has the optical advantage that when the object viewed faces the flat sides of the elements, a much greater magnification can be secured before spherical aberration seriously reduces the area of effective field of view.

Mechanically, the elements 34 and 36 are spaced apart by an annulus 38 of rubber or plastic and held assembled by a two-piece metal annular holder. The two-piece holder of Figure 4 includes the bottom lip 40, the bottom cone 42, and the inner sleve 44 constituting the lower one of a pair of members. At the top I provide the top lip 46, the top cone 48, and the outer sleeve integral therewith. In this construction I fashion the lips 40 and 46 to lie substantially in plane of the surface they engage, and the compression of the annulus 38 develops residual stress enough to keep the assembly tight. The upper edge of the sleeve 44 is curved inward a trifle before assembly, as clearly indicated at 52, and the lower edge of sleeve 50 may be flared out just a little. Then, when the parts are pressed into assembled position, the sleeve 44 is mechanically reduced in size a few thousandths of an inch and the sleeve 50 increased in size. After the final axial approximation has taken place, the extreme lower edge of the sleeve 50 is pushed in a little with another die, as clearly indicated at 54. In the final assembly, heavy friction between the sleeves provides a strong and permanent assembled structure.

Figure 5:
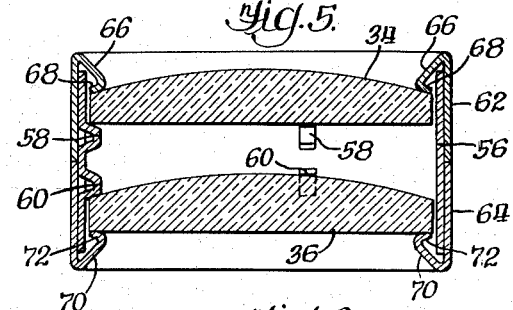
Figure 5 is a similar section of a two-piece lens means with a three-piece holder.

Referring now to Figure 5, the same lenses 34 and 36 are illustrated with a three-piece holder. The inner sleeve 56 has three equally spaced bosses 58 projecting inwardly and defining a three-point support for the lower surface of the lens 34. The same sleeve also has three equally spaced bosses 60, illustrated in axial alignment with the bosses 58, and defining a three-point abutment for the upper surface of the lens 36. I prefer to form the bosses 58 and 60 of an axial length equal to about one-third the distance between the lenses, but it will be obvious that if a greater axial length is desired, the bosses 60 could be out of axial alignment with the bosses 68 and have axial dimensions up to ninety percent of the distance between the lens surfaces.

The top, outer half-sleeve 62 and the bottom half-sleeve 64 may be substantial duplicates, and, in assembled position, come into abutment with each other. The top sleeve 62 carries the integral cone 66 which carries the reversely and outwardly turned lip 68 engaging the lens 34. Similarly, the bottom half-sleeve 64 carries the integral cone 70 and the reversely and outwardly turned lip 72. It will be noted that the lips 68 and 72 are cones sloping at a relatively small angle to a transverse plane, while the cones 66 and 70 slope at approximately forty-five degrees. Therefore, assembly by successive bending operations as described in Figure 3 will leave the relatively flexible lips pressing firmly against the adjacent lenses so that the assembly will stay tight. By turning the lips 68 and 72 outwardly instead of inwardly, a materially larger area of the lenses is available for use than with the inwardly extending lips of Figure 3.

Figure 6:
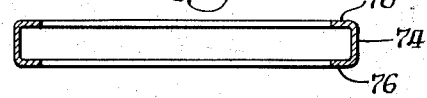
Figure 6 is a section of a modified spacer element suitable for use in constructions according to Figure 4 or Figure 5.
Figure 7:
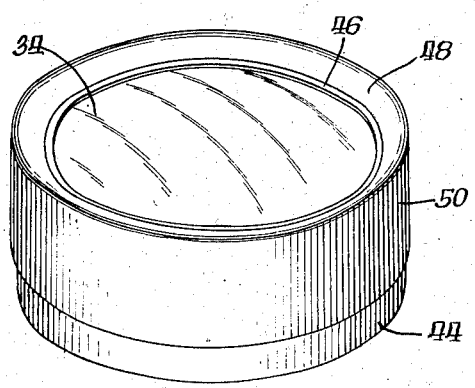
Figure 7 is a perspective of the embodiment of Figure 4.
Figure 15:
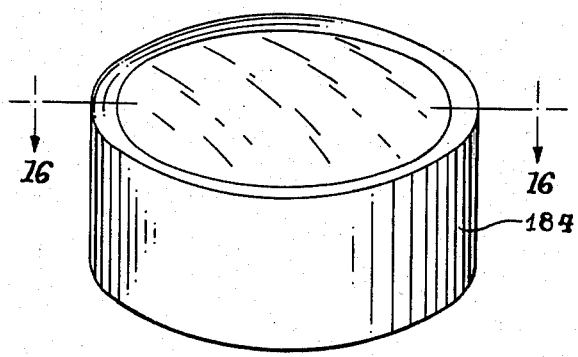
Figure 15 is a perspective of another embodiment.
Figure 16:
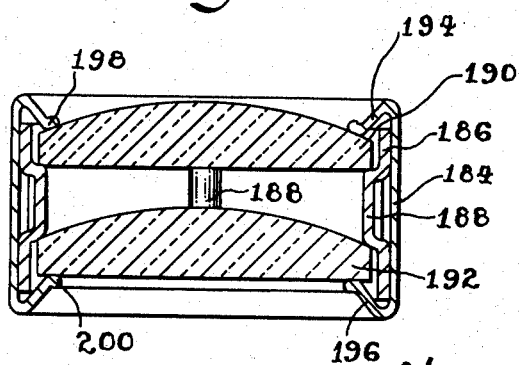
Figure 16 is a section on line 16—16 of Figure 15.
Figure 18:
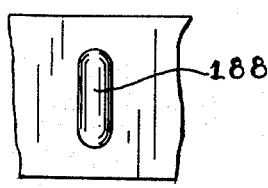
Figure 18 is a detail on line 18—18 of Figure 17.
Figure 17:
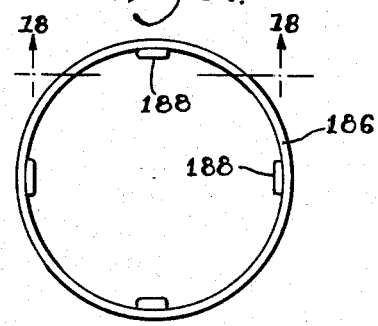
Figure 17 is a plan view of the liner for Figure 16.

In Figure 6 I have indicated a metallic spacer element comprising a sleeve 74 and duplicate, inwardly projecting flanges 76. Such a sleeve is an effective and, under certain circumstances, a desirable substitute for either the ring 38 of Figure 4 or the lugs 58 and 60 of Figure 5. In either instance, the lower flange 76 will be deflected upwardly a few thousandths of an inch by its contact with the curved lens surface and this resilience is desirable in getting an assembly that will not work loose.

The complete assembly of the type described is commonly made up with an outside diameter of two and one-eighth inches, which happens to be a convenient size for holding between the thumb and first finger of one hand and for viewing a fairly large area. For extremely short-sighted people who need such magnification for reading ordinary printed books, it should be made up in a much larger diameter, but for magnifying small articles for inspection purposes, the diameter stated does very well.

It is also a most convenient diameter for the combined uses indicated in Figures 8 to 11. For such combined use, the fitting of Figures 10 and 11 is clamped on the magnifying glass proper. The opposed jaws 78 and 80 each comprise a channel-shaped portion with the legs of the channel extended to form ears 82 and 84 adapted to receive the pivot bolt 86. The legs of the channels end at the base of the risers 88 and 90 and the reversely curved end portions 92 and 94 complete the structure. It will be obvious that the clamping jaws 78 and 80 can be duplicates except that the jaw 80 is a little wider than the jaw 78. With the clamping jaws embracing the peripheral frame, the fastening bolt 96 is tightened to unite the parts into an assembly that remains rigid during all normal use. The pivot 86 passes through the opposed channel-shaped terminal portions 98 of the split tube 100 and is provided with at least one spring washer 102 so that the user can easily adjust the bolt to make the friction resisting turning materially greater than the weight carried by the pivot and still materially less than the force that can easily be exerted in moving the parts to adjusted position by hand.

Because the tube 100 is split, it can be made of a size to be forced over the end of a supporting standard such as the standard 104 of Figure 8. A common diameter for such standards is five-sixteenths of an inch. Except for the parts indicated in Figure 10, the assembly of Figure 8 is conventional and includes the supporting base 106, which may or may not be clamped in place by a fastener 108, and which supports standard 104 in a conventional mounting 110. At an intermediate height on the standard 104, the clamp bracket 112 supports a conventional contact indicator 114 having a contact point 116 and an indicator needle and dial at 118. It will be apparent that with the dial 118 in almost any position, the lens may be set in a corresponding position so that an operator moving a piece in place in front of the indicator 114 will, naturally and comfortably, have his head in a position where the lens 34 is presented to his eye to facilitate accurate reading of the gauge.

In the application indicated in Figure 9, the table 120 carries a vernier height gauge, including the base 122, the standard 124, and the slide 126, having vernier graduations at 128 to be read in conjunction with the cathetometer scale 130. With the work piece in position 132 on the table under the contact point 134, the gauge itself is adjusted by conventional means. In this application the same lens of Figure 8 is shown on the end of a diagonal supporting arm 136 supported on the table edge by a special clamp indicated as a whole by the reference character 138. The clamp 138 includes the top panel 140 and the bottom panel 142. Each panel is stiffened by a peripheral bead 144 and carries five transverse corrugations 146 struck out of the body of the panel and extending in toward the opposite panel. The top panel carries a bracket on its under side, including the base 148 and the dependent ears 150. The bottom panel carries a similar bracket comprising the base 152 and ears 154. The ears 150 and 154 are pivotally connected by the bolt 156, with its ends riveted. Spring means are provided of sufficient strength to cause the panels 140 and 142 to pinch the edge of the table 120 with sufficient force to hold the parts in place effectively. I have illustrated a coil spring 158 having radial contact arms 160 pressing against the panels 140 and 142 at points spaced away from the pivot bolt 156 on the opposite side from the gripping corrugations 146. By grasping the ends of the panels 140 and 142 remote from the corrugations 146, the user can overcome the spring and open the clamp.

A universal connecting means is provided between the arm 136 and the panel 140. As best indicated in Figures 12 and 14, the arm 136 is curved through a right angle and carries a ball point 162 integral with a stem 164, which is a press fit in the counterbored end of the stand 136, with an abutment flange 166 to limit the inward movement in assembly. The spoon-shaped clamping plate 168 has a toe 170 at one end and a circular aperture at 172 of a diameter to ride on the ball 162 and force it into firm frictional engagement with a concave boss 174 struck up from the panel 140. The friction on the ball 162 may be conveniently adjusted by means of the tension bolt 176, having a screw driver slot 178 in its upper end engaging the square anchor nut 180. The bracket base 148 provides additional strength adjacent the tension bolt 176 and has small ridges 182 to anchor the nut 180 against rotation. It is convenient to have the base 152 formed with duplicate ridges 182. The ridges 182 on the base 152 perform no function in the assembled unit, but because they are present, a simpler set of combined dies can be employed to manufacture both brackets.

In all the embodiments disclosed, the optical unit itself has all its parts, except the externally exposed glass surfaces, hermetically sealed in an air-tight enclosure substantially moisture-proof and dust-proof, so that in normal usage there is never any need to clean or polish anything except the externally exposed optical surfaces.

Referring now to Figures 15–18 inclusive, the one-piece cylindrical housing 184 corresponds to the housing 26 of Figure 3. The liner 186 fits snugly in the housing 184. It is a simple ring with four inwardly projecting bosses 188 functioning as spacer elements to contact the upper lens 190 and the lower lens 192. As in Figures 3, 4 and 5, the lenses terminate axially short of the housing for mechanical protection.

Such a structure may conveniently be assembled in either one of two ways. First, the liner is made a light press fit in the housing and is pushed into final position. Then one of the lenses is laid in position in contact with the bosses 188 and the projecting end of the housing turned inward to define the conical restraining portion, 194 for the lens 190, or 196 for the lens 192. The assembly is then turned the other side up and the other lens dropped in place and the other cone formed, in both instances with a slight offset 198 or 200 formed by engagement between the metal and the lens so that the parts are firmly and permanently assembled.

The other method of assembly is to form one of the conical portions, 196 for instance, first, and have the ring 186 fit in place with much less friction. In such assembly the housing is positioned as in Figure 16, with the cone 196 already formed and the upper end still open. The lens 192 is laid on the lip 200 and the liner pushed down on top of it and the lens 190 laid in place and the cone 194 formed by bending the material in. For all practical purposes the finished structure is substantially identical in both cases.

Others may readily adapt the invention for use under various conditions of service by employing one or more of the novel features involved or equivalents thereof. As at present advised with respect to the apparent scope of my invention, I desire to claim the following subject matter.

I claim:

In a glass adapted to form a sharply defined virtual image suitable for reading purposes, in combination: a one-piece cylindrical housing; a plurality of coaxial lens elements in said housing; and structural means connecting the edges of said lens elements to said housing, comprising: a sleeve liner telescoped in said housing and in firm contact therewith; a plurality of inward projections formed on said liner and uniformly spaced about the circumference thereof; said projections having their upper ends and their lower ends all located in the same parallel spaced planes; said lens elements abutting said projections and being restrained by such abutment from axial movement toward each other; and conical retainer members located at opposite ends of said housing and integral with said housing and preventing movement of said lens elements away from each other; the ends of said sleeve liner terminating in said conical retainer members and said inward projections being formed intermediate the ends of said sleeve liner; each retainer comprising a wall extending diagonally inward toward the axis and axially toward the opposite end; each retainer having an edge portion in abutment with the adjacent lens element; said abutting edges being slightly deformed to secure good surface contact with the adjacent lens structure; each of said retainers extending axially away from its cooperating lens element to a plane axially beyond said lens element; whereby the dropping of the entire structure on a flat surface cannot bring the flat surface into engagement with the lens element proper.

References Cited in the file of this patent

UNITED STATES PATENTS

| | | |
|---|---|---|
| 494,855 | Goodyear | Apr. 4, 1893 |
| 870,535 | Bousch | Nov. 12, 1907 |
| 1,053,512 | Huntoon et al. | Feb. 18, 1913 |
| 1,806,422 | Shaen | May 19, 1931 |
| 1,900,930 | Hauser | Mar. 14, 1933 |
| 1,989,454 | Koster | Jan. 29, 1935 |
| 2,355,161 | Halstein | Aug. 8, 1944 |
| 2,652,499 | Argabrite | Sept. 15, 1953 |
| 2,767,612 | Hofer | Oct. 23, 1956 |

FOREIGN PATENTS

| | | |
|---|---|---|
| 6,777 | France | Jan. 7, 1907 |
| | (1st add. to No. 345,973) | |
| 380,255 | France | Oct. 3, 1907 |
| 430,131 | France | Aug. 3, 1911 |
| 228,704 | Great Britain | Feb. 12, 1925 |